(12) United States Patent
Calvet et al.

(10) Patent No.: US 8,397,967 B2
(45) Date of Patent: Mar. 19, 2013

(54) PROCESS FOR DETERMINING USAGE DATA FOR A PORTABLE HAND-ACTIVATED APPARATUS AND THE DEVICE FOR IMPLEMENTING THE PROCESS

(75) Inventors: Pierrick Calvet, Saint Nazaire les Eymes (FR); Nicolas Guihard, Caluire et Cuire (FR); Florent La Bella, Romans sur Isere (FR)

(73) Assignee: Societe de Prospection et d'Inventions Techniques SPIT, Bourg les Valance (FR)

( * ) Notice: Subject to any disclaimer, the term of this patent is extended or adjusted under 35 U.S.C. 154(b) by 643 days.

(21) Appl. No.: 11/994,266

(22) PCT Filed: Jul. 1, 2006

(86) PCT No.: PCT/IB2006/001818
§ 371 (c)(1), (2), (4) Date: Dec. 28, 2007

(87) PCT Pub. No.: WO2007/004025
PCT Pub. Date: Jan. 11, 2007

(65) Prior Publication Data
US 2009/0000801 A1 Jan. 1, 2009

(30) Foreign Application Priority Data
Jul. 1, 2005 (FR) .................................... 05 07042

(51) Int. Cl.
*B25C 1/08* (2006.01)
(52) U.S. Cl. .................................. 227/2; 227/9; 227/10
(58) Field of Classification Search .................. 227/2, 8, 227/10, 4, 5; 123/46 SC; 703/33; 173/1, 173/20, 210, 211, 212; 92/85 R, 85 A, 85 B; 91/392, 410
See application file for complete search history.

(56) References Cited

U.S. PATENT DOCUMENTS

| | | | | |
|---|---|---|---|---|
| 4,474,154 A | * | 10/1984 | Henning et al. | 123/339.21 |
| 5,431,134 A | * | 7/1995 | Budde et al. | 123/146.5 A |
| 5,448,477 A | * | 9/1995 | Delatorre et al. | 702/6 |
| 5,449,047 A | * | 9/1995 | Schivley, Jr. | 175/27 |
| 5,803,347 A | * | 9/1998 | Sainz et al. | 229/117.16 |
| 6,216,935 B1 | | 4/2001 | Oussani et al. | |
| 6,510,902 B1 | * | 1/2003 | Prokop et al. | 173/1 |
| 7,104,190 B2 | * | 9/2006 | Dahlberg | 100/35 |
| 7,404,449 B2 | * | 7/2008 | Bermingham et al. | 173/2 |
| 2003/0015088 A1 | * | 1/2003 | Wursch et al. | 89/1.14 |
| 2004/0104259 A1 | | 6/2004 | Sprenger et al. | |
| 2005/0000998 A1 | * | 1/2005 | Grazioli et al. | 227/2 |
| 2005/0001000 A1 | | 1/2005 | Favre-Bulle et al. | |
| 2006/0155582 A1 | * | 7/2006 | Brown | 705/3 |

FOREIGN PATENT DOCUMENTS

| FR | 2847502 A | 5/2004 |
|---|---|---|
| FR | 2856325 A | 12/2004 |

OTHER PUBLICATIONS

ISR for PCT/IB2006/001818 mailed Nov. 7, 2006.

* cited by examiner

*Primary Examiner* — M. Alexandra Elve
*Assistant Examiner* — Nathaniel Chukwurah
(74) *Attorney, Agent, or Firm* — Lowe Hauptman Ham & Berner, LLP

(57) ABSTRACT

An apparatus and method for determining usage data includes driving a drive piston, damping the drive piston, and determining usage data indicating if the drive piston is being over-powered or under-powered.

12 Claims, 3 Drawing Sheets

PROCESS FOR DETERMINING USAGE DATA FOR A PORTABLE HAND-ACTIVATED APPARATUS AND THE DEVICE FOR IMPLEMENTING THE PROCESS

RELATED APPLICATIONS

The present application is based on International Application Number PCT/IB2006/001818 filed Jul. 1, 2006, and claims priority from French Application Number 0507042 filed Jul. 1, 2005, the disclosures of which are hereby incorporated by reference herein in their entirety.

TECHNICAL FIELD

The invention comprises adapting the power for fastening devices for fastening elements in a support material for the size of these fastening elements as well as for the type of material.

Nails and staples can be taken into consideration as fastening elements.

More generally, the invention comprises all portable hand tools, certainly of the type for nailing and stapling, but also for perforating or even for demolishing, in short, all tools used for purposes such as construction, building, and public works.

The invention is applicable for gas-powered tools, but may also apply to powder tools, electric tools or pneumatic tools.

BACKGROUND

All these tools are activated by indirect firing, with a drive piston, specifically a fastening plug or nail, where the piston is propelled forwards until its head is crushed against a damper.

All these tools can withstand numerous impacts, essentially two at each firing, one at the moment of ignition, when a gas apparatus or cartridge is involved, and another when the piston is crushed against the damper.

Crushing of the piston against the damper can cause a second impact:
a) shortly after the first one, which is a significant impact, in the event that it is fired when empty;
b) a bit longer afterwards, but still relatively significant for a scenario involving a short nail or a delicate material;
c) a longer time afterwards, for a long nail or hard material or
d) an even longer time afterwards, in the case of a long nail or very hard material.

In the first case, a), the apparatus is very clearly over-powered, in the second case, b), it still is, but less so, in the third case c), the apparatus is only very slightly over-powered and finally, in the fourth case d), the apparatus is under-powered.

Using an under-powered apparatus is no more desirable than using an over-powered one, since this could lead to deterioration and cause premature wear. It is even worthwhile to alert an operator of the apparatus in case of intensive use with more or less than ideal power, and even to prevent him from continuing to use his apparatus.

SUMMARY

The applicant had wished to address this problem of adapting the power of a fastening apparatus to the conditions surrounding its use, and even the adequacy of the apparatus itself for these usage conditions, by, for example, reducing its weight or abandoning some sturdiness or mechanical strength requirements, to focus on adapting the apparatus to the exact purpose for which it is designed and extend its lifespan as much as possible. This is the problem that is the motivation for this invention and its innovation.

In this way, the invention first involves a process for determining usage data for a hand-operated portable apparatus that uses indirect firing by a drive piston and comprises among other things a means for propelling the piston and a means of damping the piston, a process in which usage data from the apparatus is used and the apparatus is adapted to this data.

Adaptation can be achieved in real time and in this case its utility lies in warning the operator, specifically by warning him of firings that are under- or over-powered.

We can thus measure the time elapsed between ignition and the impact of the piston on the means of damping.

Usage of the apparatus can be adapted by determining the piston's consumed and residual energy on the means of damping, and the energy consumed can depend, in the case of a device for fastening of fastening elements, on the length of the elements and on the strength of the support material on which the elements are mounted.

Residual energy can be determined by a sensor. The following can be considered a sensor: a piezoelectric sensor, a strain gauge sensor, an accelerometer or any other impact detector.

But adaptation can also take place in deferred time in order to adapt the apparatus' power for the purpose of diagnostics, maintenance or even designing future devices.

In this case, usage data for the apparatus is identified and stored in the apparatus before their final utilization.

The invention also relates to a manually activated portable apparatus with indirect firing using a drive piston that consists among other things of a means of propelling the piston and a means of damping the piston, distinguished by the fact that it comprises a means for detecting the piston's impact against the means of damping.

Preferably, the impact detector is selected from the group comprising a strain gauge sensor and a piezoelectric sensor.

Advantageously, the apparatus comprises a means of detection of the ignition and a means of calculating the time elapsed between an ignition and the impact of the piston against the means of damping.

Preferably, the means of calculating are arranged so as to determine the residual energy of the piston at the moment of its impact against the means of damping, and, even more advantageously, at an alert threshold.

BRIEF DESCRIPTION OF THE DRAWINGS

The invention will be better understood through the following description of a preferred manner of embodiment of the invention's apparatus, in reference to the attached drawing in which.

DETAILED DESCRIPTION OF THE DRAWINGS

Figure 1:
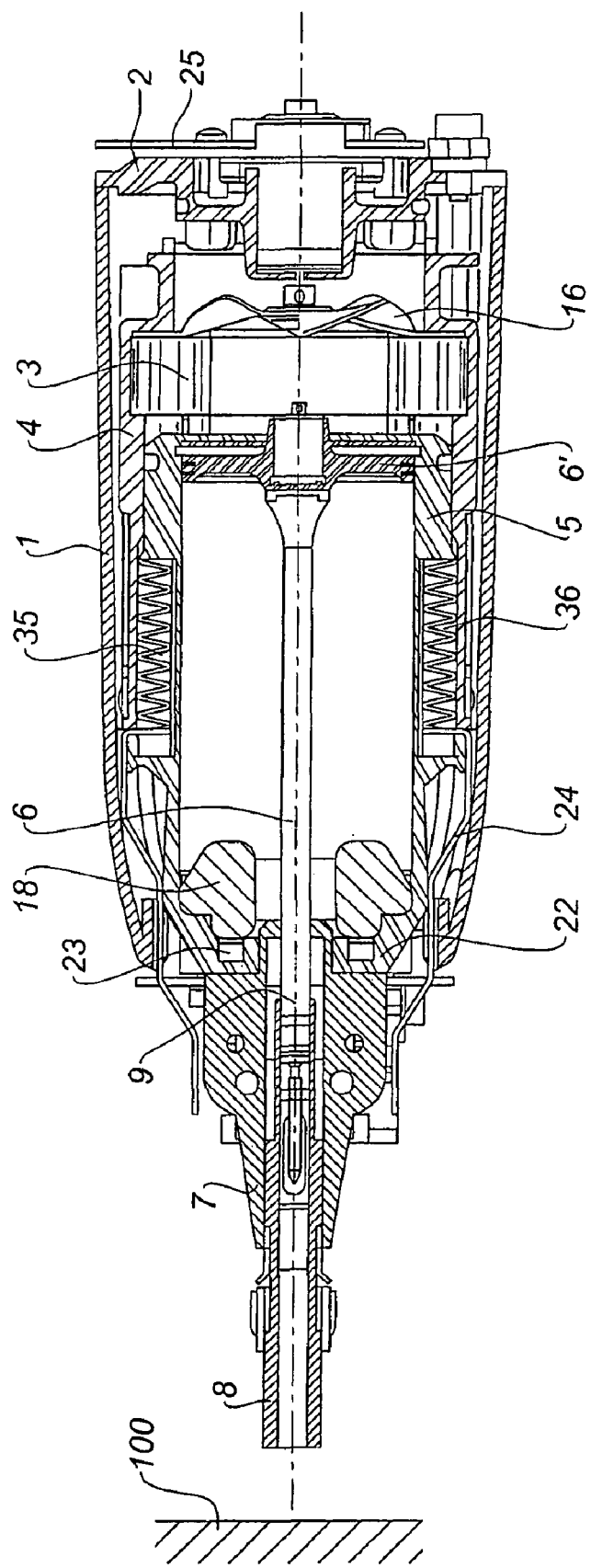
FIG. 1 shows a section view of the apparatus of the invention, comprising an impact detector and a calculation module that permits implementation of the invention's process.

In reference to FIG. 1, the apparatus here is a fastening device for gas-powered fastening elements.

In its standard embodiment, it comprises, in a housing 1, a rear base 2, a combustion chamber 3, a combustion chamber sleeve 4, a cylinder 5, a piston 6, a plug guide 8 and a plug guide support 7. The plug guide 8 functions as a sensor for bracing and closure of combustion chamber 3.

Combustion chamber sleeve 4 is mounted by sliding onto cylinder 5, closes combustion chamber 3 behind and in front, with piston 6 and cylinder 5. Piston 6, which is equipped with a rear head 6', is mounted by sliding onto cylinder 5, which is integral to housing 1. Plug guide 8, which projects outside of the front of housing 1, is mounted by sliding into the plug guide support 7, which is integral to housing 1.

Cylinder 5 contains, at its front, a damper 18, which is integral to cylinder 5, against which head 6' of piston 6, which is propelled forward during a firing, is designed to push up against and, in the rear, a mixing ventilator 16.

All these elements of the apparatus have a common axis 9.

Springs 35 and 36 are designed to return to the front, in the resting position, sleeve 4, when the apparatus is leaving the supported state. When the device is in the resting position, sleeve 4 and plug guide 8 are returned to the front by springs 35 and 36 and the combustion chamber 3 is opened in the rear.

A supply magazine, here supplied with nails (not shown), connects with the plug guide 8, for loading nails in the plug guide 8.

The device consists of a piezoelectric sensor 23 between the front transverse base 22 of cylinder 5 and damper 18, which is in front of the latter. We could also have provided, glued to base 2, an accelerometer or a bearing impact detector or an extensometric strain gauge sensor mounted on base 2 or cylinder 5. Sensor 23 could also have been located inside damper 18.

Sensor 23 is electrically connected to a calculation module 25, which is an electronic board that here is attached to base 2, and which essentially comprises a calculation function 26 which will be explained in further detail later.

Figure 2:
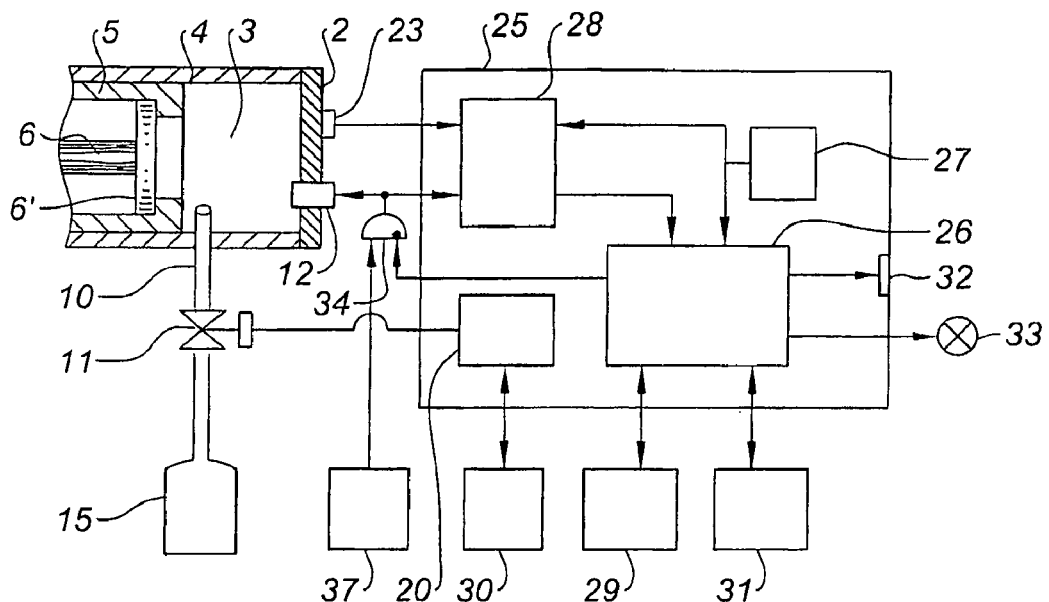
FIG. 2 shows a functional block diagram of the invention's apparatus and a diagnostic assistance system coupled to the apparatus.

Referring to FIG. 2, the device consists among other things of rewritable memory boards 29 and 31, which can be located on module 25, and a warning light 33, all of which are connected electrically to module 25, and a gas injection conduit 10, which is connected to a gas admission device 11 (a solenoid valve). A spark and ignition plug 12 plunges into chamber 3.

Solenoid valve 11, which is connected to a gas cartridge 15, for opening and closing conduit 10, injects, into chamber 3, before each firing, a quantity Q of gas for an opening period D that corresponds to a firing power P.

When the device is braced against a support 100 (FIG. 1), the plug guide 8 is driven backwards relative to its support 7, to cylinder 5 and housing 1. Displacement of plug guide 8 drives sleeve 4 backwards, through the use of cage 24, until combustion chamber 3 is closed at its rear by base 2 and, in front, by head 6' of piston 6 and cylinder 5.

While the recoil of sleeve 4 is being detected by a contact 30, solenoid valve 11 is opened by a solenoid valve control function 20 of module 25 during time period D and gas is injected by conduit 10 from cartridge 15 in combustion chamber 3. And when sleeve 4 comes into contact with base 2, it activates ventilator 16 in order to stir the contents of chamber 3.

When controlled firing of the device is activated through ignition 37, these means 37 trigger, on the one hand, a collecting function 28 of module 25 and, on the other hand, spark plug 12 that causes the gas-air mixture contained in combustion chamber 3 to explode; this causes propulsion of piston 6 forwards with a total kinetic energy Et that is equal to firing power P.

Since a nail was installed in plug guide 8, piston 6 taps on the nail, which is propelled forwards and is pressed into support 100, and in so doing consumes a usable energy Eu.

At the end of the process, head 6' of piston 6 is thrust against damper 18 with a residual kinetic energy Er, combustion gasses escape from cylinder 5 and combustion chamber 3 and piston 6 is driven backwards so that it returns to the rest position.

Energy Eu is such that:

$$Eu=Et-Er$$

At the device's support exit, return springs 35 and 36 are released, plug guide 8 and sleeve 4 return to the resting position and combustion chamber 3 opens in the back once again.

Figure 3:
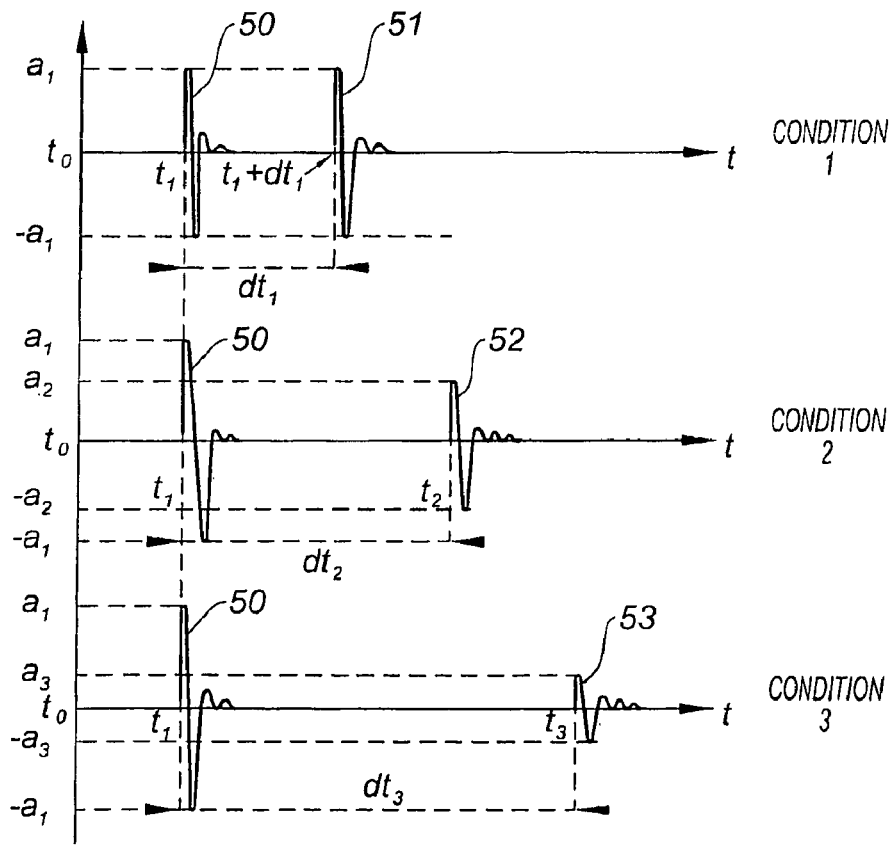
FIG. 3 shows the compared timing charts corresponding to a firing when empty and two firings, with fastening elements of different lengths.

After solenoid valve 11 is closed at instant t0, impact sensor 23, in reference to FIG. 3, can detect successive impacts 50, 51 or 52 or 53 that result in explosion of the mixture at an instant t1 and in the dissipation of energy Er at the end of piston 6's travel in damper 18 at various time intervals dt1, dt2, dt3 after t1 according to usage conditions 1, 2, 3.

Condition 1: there is no nail in plug guide 8, which causes firing when empty. This could happen when the magazine is empty. dt1 is the minimum time period. On the other hand, signals 50 and 51 delivered by the impact sensor 23 are noticeably the same and are of amplitude equal to a1.

Condition 2: the short nail has been fired. dt2 is a period that is still greater than the maximum dt1 known from prior experience and recorded in memory 29. Firing still remains over-powered, with a residual energy signal amplitude a2, which is smaller than a1.

Condition 3: a long nail has been fired. dt3 is a period of time that is still greater than the maximum dt2 known from prior experience and recorded in memory 29. Firing is slightly over powered with a signal amplitude a3 that is smaller than a2.

Condition 4: one of the preceding conditions for which a2 or a3 are not even sensed; firing is under-powered.

Nail length has been taken into consideration as usage data. The hardness or resistance of the receptor material is another that could be combined with the length of the nails. In this way, condition 2 can correspond to a soft material and condition 4 to a very hard material.

The calculation of time periods dt1, dt2 and dt3 is carried out through collection function 28 with the help of real-time blips from a timer 27.

Here, time periods dt1, dt2, dt3 are calculated by finding the difference between instant t1 of the firing signal issued by ignition means 37 and the instant of reception t1+dt1, dt2, dt3 of the second impact 51, 52, 53 counted starting from t1.

If, as in condition 4, this second impact does not occur within a predetermined period of time, total energy Et is insufficient or, as in condition 1, the device is fired when empty, the user is notified by a specific signal 33, which can be either visual or aural. In this latter case, function 26 counts the number of empty firings and, using a circuit ET 34 blocks the firing of spark plug 12 if this number exceeds a predetermined threshold that has been recorded in memory 29.

Under normal firing conditions such as the last two above, impact amplitudes 52 and 53 at the end of travel a2 and a3 are smaller than quantity a1 that corresponds to empty firing. This data a1, a2, a3 is also, if applicable, collected by collecting function 28 and transmitted to the calculation function 26.

Calculation function 26 deduces energies Et, Er and Eu from it starting with these amplitudes a1, a2, a3, which are directly representative of the kinetic energies of piston 6 at firing and at the end of the process.

We could also compare the amplitude of the residual energy to a threshold and set off an alert in case this threshold is exceeded and, as in the previous case, block the apparatus if the number of times the threshold is exceeded exceeds another threshold.

Figure 4:
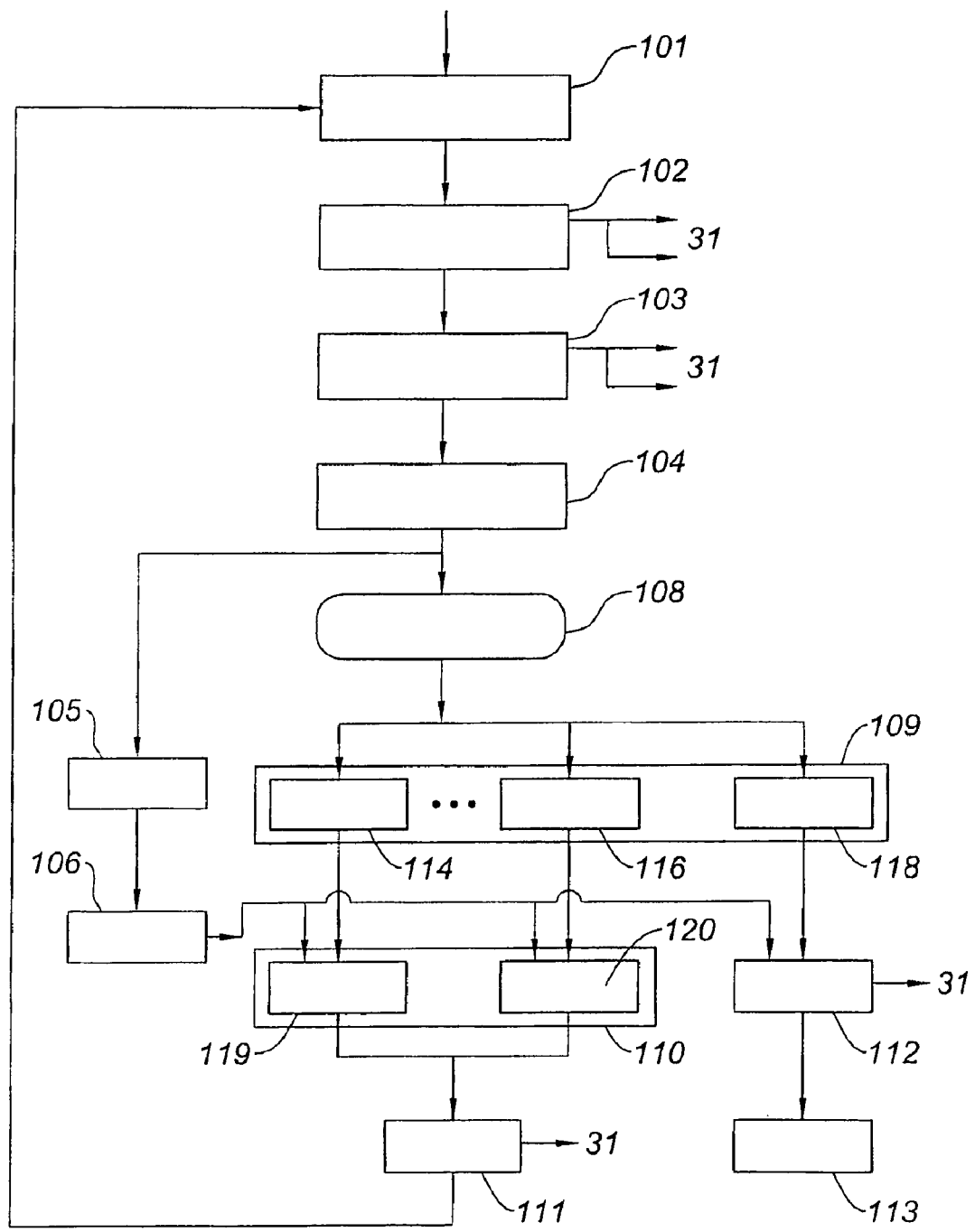
FIG. 4 shows a timing chart with the preferred manner of determining usage data for the invention's apparatus and of using this data.

In reference to FIG. 4, in order to adjust firing power P of the fastening device, we proceed as follows, where adaptation of the device is then conducted in deferred time.

During a stage 103, sensor 23 senses characteristic usage data a1, a2 a3 at instants t1, t2, t3 in reference to detection function 28, according to timer blips real timer time 27.

During a stage 104, detection function 28 shows time periods between the is instant of ignition and that when the head 6' impacts piston onto damper 18, dt1, dt2, dt3.

At a stage 105, calculation function 26 calculates the residual energy Er using data a1, a2, a3, and in stage 106 useful energy Eu=Et−Er which is also representative of support material 100, which takes into consideration the nail driven into it.

The nature of the nails, notably their length, is determined during stage 108 through the function of calculation 26, by comparing the values of dt1, dt2 or dt3 to maximum values dt1, dt2, dt3 recorded in memory 29.

Function 26 then executes a processing stage 109 in which it determines the nature of the material through an operation 114 or 116 or another operation that is chosen by taking into consideration the length of the nail and the useful energy Eu calculated during stage 106, or an operation 118 that discriminates between firings that were empty or under-powered.

Once operation 118 has been completed, we pass on to stage 112, recording characteristic usage data in memory 31 and counting data for issuing an alert to the user during a stage 113 or to block the apparatus by inhibiting gate ET 34.

Otherwise, during stage 110, we use unabsorbed residual energy Er that was calculated during stage 105 in order to calculate firing power P as a function of predetermined usage data that was recorded in memory 29, i.e. the time period D for opening solenoid valve 11, through an operation 119 or 120 or another chosen according to the nature of the fastening, length of nail or other, as a function of the nature of the material. For example, we set the residual energy at a percentage of useful energy Eu calculated at stage 106.

During an operation 111, characteristic usage data from the device is 10 recorded in memory 31, and the value of time period D is updated, as soon as this value D has been calculated in memory 29.

The device is ready for a new utilization in which, during stage 101, the command function 20 of solenoid valve 11 uses the D that was just recorded in memory 29 to inject an optimal quantity of gas into chamber 3, at stage 102 the means for igniting 37 control firing of spark plug 12 with authorization of gate 34, and at the same time send a signal to the collection function 28 which reads at the instant t1 it reaches it, in order to begin a new stage 103.

When reading memory 31, calculation function 26 is in a position, when it returns from maintenance, to transmit, to a computerized means of maintenance (not shown) a history of the use of the apparatus using a plug 32 that has been provided on the apparatus, for example a series RS 232 connector.

It is thus possible for a user to fully evaluate the usage conditions for the apparatus during maintenance of the apparatus and to use the successive recorded information as a troubleshooting diagnostic aid by searching, in the device's recordings, for the causes of any perceived failure or wear.

Ordinarily, we determine the dimensions of the different elements of the structure of the tool hereinabove: cylinder piston, chamber sleeve and base, etc. as a function of the total theoretical energy Et dissipated during firing.

Here, we can determine, as a function of the maximum energy Eu, calculated over real usage data for a set of devices during a predetermined time, energy that is lower than Et.

We could therefore subsequently produce tool structures that are lighter and less expensive.

The invention claimed is:

1. A process of determining usage data for a portable hand-activated apparatus that uses indirect firing by a drive piston, the process comprising:
   driving the drive piston;
   receiving a first impact signal from an impact sensor, the first impact signal corresponding to initiation of the driving;
   damping the drive piston by a damper of the portable hand-activated apparatus;
   receiving a second impact signal from the impact sensor, the second impact signal corresponding to the damping of the drive piston; and
   generating the usage data indicating if the drive piston is being over-powered or under-powered based on a time period elapsed between the first impact signal and the second impact signal.

2. The process according to claim 1, further comprising alerting a user if the drive piston is being under-powered or over-powered.

3. The process according to claim 1, further comprising storing the usage data in the apparatus.

4. A process of determining usage data for a portable hand activated apparatus that uses indirect firing by a drive piston, the process comprising:
   driving the drive piston;
   receiving a first impact signal from an impact sensor, the first impact signal corresponding to initiation of the driving;
   damping the drive piston by a damper of the portable hand-activated apparatus;
   receiving a second impact signal from the impact sensor, the second impact signal corresponding to the damping of the drive piston; and
   generating the usage data indicating if the drive piston is being over-powered or under-powered;
   wherein the generation of the usage data includes measuring energy consumed by said driving the drive piston and residual energy of the drive piston dissipated by said damping the drive piston according to amplitudes of the first impact signal and the second impact signal.

5. The process according to claim 4, further comprising alerting a user if the drive piston is being under-powered or over-powered.

6. The process according to claim 4, further comprising storing the usage data in the apparatus.

7. A manually activated portable apparatus, comprising:
   a drive piston;
   a means for propelling the drive piston;
   a means for damping the drive piston;
   an impact sensor configured to generate a first impact signal corresponding to initiation of driving the drive piston and a second impact signal corresponding to the drive piston being thrust against the damping means; and
   a controlling module configured to receive the first impact signal and the second impact signal from the impact sensor and to determine if the drive piston is driven over-powered or under-powered, wherein the controlling module is configured to calculate a time period elapsed between the first impact signal and the second impact signal.

8. The apparatus according to claim 7, wherein the impact sensor is a strain gauge sensor or a piezoelectric sensor.

9. The apparatus according to claim 7, wherein the controlling module is configured to determine residual energy of the drive piston at the instant of impact against the damping means according to amplitudes of the first impact signal and the second impact signal.

10. The apparatus according to claim 7, wherein the impact sensor is disposed in front of the damping means.

11. The apparatus according to claim 7, wherein the impact sensor is disposed on a base of the apparatus.

12. The apparatus according to claim 7, wherein the apparatus is configured for gas-powered fastening and comprises a cylinder in which the drive piston is mounted and wherein the impact sensor is disposed on the cylinder.

* * * * *